United States Patent
Du et al.

(10) Patent No.: US 10,966,163 B2
(45) Date of Patent: Mar. 30, 2021

(54) METHOD AND MOBILE TERMINAL FOR REDUCING RADIATION

(71) Applicant: HuiZhou TCL Mobile Communication Co., Ltd., HuiZhou (CN)

(72) Inventors: Kai Du, HuiZhou (CN); Lina Yang, HuiZhou (CN); Shifeng Cao, HuiZhou (CN); Ruihua Zhang, HuiZhou (CN); Tao Li, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 16/630,441

(22) PCT Filed: Jul. 12, 2018

(86) PCT No.: PCT/CN2018/095481
§ 371 (c)(1),
(2) Date: Jan. 12, 2020

(87) PCT Pub. No.: WO2019/011301
PCT Pub. Date: Jan. 17, 2019

(65) Prior Publication Data
US 2020/0196249 A1  Jun. 18, 2020

(30) Foreign Application Priority Data
Jul. 12, 2017 (CN) .......................... 201710566392.1

(51) Int. Cl.
*H04W 52/24* (2009.01)
*H04W 52/28* (2009.01)
*H04W 52/36* (2009.01)

(52) U.S. Cl.
CPC ....... *H04W 52/288* (2013.01); *H04W 52/367* (2013.01)

(58) Field of Classification Search
CPC .......................... H04W 52/288; H04W 52/367
(Continued)

(56) References Cited

U.S. PATENT DOCUMENTS

| 7,146,139 B2 * | 12/2006 | Nevermann | H04B 1/3838 |
| | | | 455/115.1 |
| 7,330,705 B2 * | 2/2008 | Lee | H04B 1/3838 |
| | | | 455/115.1 |

(Continued)

FOREIGN PATENT DOCUMENTS

| CN | 101668070 | 3/2010 |
| CN | 101895977 | 11/2010 |

(Continued)

OTHER PUBLICATIONS

International Search Report and the Written Opinion dated Sep. 7, 2018 From the International Searching Authority Re. Application No. PCT/CN2018/095481 and Its Translation of Search Report Into English. (9 Pages).

*Primary Examiner* — Hai V Nguyen

(57) ABSTRACT

The disclosure provides a method for reducing radiation and a mobile terminal. The method comprises: detecting whether a current operating mode of the mobile terminal is a voice call mode or a data communication mode; and if the current operating mode of the mobile terminal is the voice call mode, transmitting by an AP side a preset first AT command to a modem to control the modem to restore a maximum transmit power for normal operation; if the current operating mode of the mobile terminal is the data communication (Continued)

mode, transmitting by the AP side a preset second AT command to the modem to control the modem to reduce the maximum transmit power.

11 Claims, 3 Drawing Sheets

(58) Field of Classification Search
USPC .................................................. 455/522, 69
See application file for complete search history.

(56) References Cited

U.S. PATENT DOCUMENTS

| | | | | |
|---|---|---|---|---|
| 7,610,027 | B2* | 10/2009 | Alapuranen | H04W 52/225 455/117 |
| 8,538,351 | B2* | 9/2013 | Wilson | H04W 72/02 455/127.1 |
| 8,774,853 | B2* | 7/2014 | Wilson | H04W 72/02 455/522 |
| 8,880,128 | B1* | 11/2014 | Gopalakrishnan | H04W 52/0261 455/574 |
| 8,886,247 | B1* | 11/2014 | Price | H04W 52/362 455/522 |
| 8,965,311 | B2* | 2/2015 | Zhu | H04W 52/04 455/127.1 |
| 8,995,938 | B2* | 3/2015 | Ali | H04B 1/3838 455/127.1 |
| 9,288,676 | B2* | 3/2016 | Trocke | G06F 21/83 |
| 9,515,378 | B2* | 12/2016 | Prasad | H01Q 1/245 |
| 9,516,151 | B2* | 12/2016 | Moran | H04W 12/069 |
| 9,578,159 | B2* | 2/2017 | Muthukumar | H04W 12/06 |
| 9,706,506 | B2* | 7/2017 | Han | H04W 52/365 |
| 9,766,324 | B2* | 9/2017 | Katz | H01Q 1/245 |
| 9,871,545 | B2* | 1/2018 | Khawand | H04B 1/3838 |
| 10,027,789 | B2* | 7/2018 | Moran | H04M 1/0256 |
| 10,224,974 | B2* | 3/2019 | Mercer | H04W 52/18 |
| 10,440,645 | B2* | 10/2019 | Nacer | H04W 52/0209 |
| 2003/0064761 | A1* | 4/2003 | Nevermann | H04B 1/3838 455/572 |
| 2003/0228875 | A1* | 12/2003 | Alapuranen | H04B 1/3838 455/522 |
| 2004/0176125 | A1* | 9/2004 | Lee | H04W 52/288 455/522 |
| 2004/0246891 | A1* | 12/2004 | Kay | H04L 27/0008 370/215 |
| 2005/0124305 | A1* | 6/2005 | Stichelbout | H04W 52/283 455/117 |
| 2006/0154687 | A1* | 7/2006 | McDowell | H04W 52/288 455/522 |
| 2007/0082661 | A1* | 4/2007 | Black | H04M 1/72409 455/418 |
| 2009/0305742 | A1* | 12/2009 | Caballero | H04B 1/3838 455/566 |
| 2010/0056210 | A1* | 3/2010 | Bychkov | H04M 1/026 455/556.1 |
| 2013/0115900 | A1* | 5/2013 | Zhu | H04W 52/288 455/115.1 |
| 2013/0172039 | A1* | 7/2013 | Drucker | H04W 52/288 455/522 |
| 2013/0178240 | A1* | 7/2013 | Kiyomoto | H04W 52/246 455/522 |
| 2013/0237272 | A1* | 9/2013 | Prasad | H01Q 3/26 455/517 |
| 2013/0252658 | A1* | 9/2013 | Wilson | H04W 52/228 455/522 |
| 2014/0036827 | A1* | 2/2014 | Han | H04W 52/365 370/329 |
| 2014/0128032 | A1* | 5/2014 | Muthukumar | H04W 4/12 455/411 |
| 2014/0187281 | A1* | 7/2014 | Faraone | H04W 52/288 455/522 |
| 2014/0346885 | A1* | 11/2014 | Walley | H02J 50/80 307/104 |
| 2016/0327634 | A1* | 11/2016 | Katz | G01S 7/411 |
| 2017/0279186 | A1* | 9/2017 | Xia | H01Q 1/245 |
| 2018/0103426 | A1* | 4/2018 | Nacer | H04W 52/0209 |
| 2019/0165824 | A1* | 5/2019 | Mohamed | H04W 88/02 |
| 2020/0015162 | A1* | 1/2020 | Nacer | H04W 52/0209 |

FOREIGN PATENT DOCUMENTS

| | | |
|---|---|---|
| CN | 202160284 | 3/2012 |
| CN | 102833836 | 12/2012 |
| CN | 103874180 | 6/2014 |
| CN | 107295141 | 10/2017 |
| WO | WO 2012/048610 | 4/2012 |
| WO | WO 2019/011301 | 1/2019 |

* cited by examiner

METHOD AND MOBILE TERMINAL FOR REDUCING RADIATION

RELATED APPLICATIONS

This application is a National Phase of PCT Patent Application No. PCT/CN2018/095481 having International filing date of Jul. 12, 2018, which claims the benefit of priority of Chinese Patent Application No. 201710566392.1 filed on Jul. 12, 2017. The contents of the above applications are all incorporated by reference as if fully set forth herein in their entirety.

FIELD AND BACKGROUND OF THE INVENTION

The invention is related to the field of mobile terminal technology, and in particular, to a method and a mobile terminal for reducing radiation.

Mobile phones need to obtain FCC certification before shipment to the United States, and EC certification before shipment to Europe. FCC and EC certifications typically require testing of specific absorption rate (SAR), also known as specific absorption rate in Chinese, for mobile phone radiation, which is to measure how much energy is absorbed by human body in a unit of watt per kilogram (W/Kg), as well as testing of whether the SAR meets the standard. A mobile phone with an exceeding SAR for radiation cannot pass the certification. Whether or not the testing can pass SAR standard is important for obtaining FCC and EC certification. As SARs may be very high for higher frequency bands, it is difficult to meet the certified SAR standard through fine-tuning hardware.

SUMMARY OF THE INVENTION

An embodiment of the invention provides a method and a mobile terminal for reducing radiation of a mobile phone.

A first aspect of an embodiment of the invention provides a method for reducing radiation for a mobile terminal, comprising the following steps:

Step A: detecting whether a current operating mode of the mobile terminal is a voice call mode or a data communication mode, performing step B if the current operating mode is the voice call mode, and performing step C if the current operating mode is the data communication mode;

Step B: AP side sending a preset first AT instruction to a modem, and the modem controlling the mobile terminal to restore the maximum transmit power for normal operation according to the first AT instruction;

Step C: AP side sending a preset second AT instruction to the modem, and the modem controlling mobile terminal to reduce the maximum transmit power according to the second AT instruction until radiation reduction of the mobile terminal reaches a preset radiation reduction value.

The method for reducing radiation, before the step A, further comprises:

Step A0: storing two sets of radio frequency parameters in the modem, of which one is a set of radio frequency parameters for the mobile terminal to restore the normal operation after receiving the first AT instruction, and the other is a set of radio frequency parameters for the mobile terminal to reduce radiation after receiving the second AT instruction.

In the method for reducing radiation, the second AT instruction includes frequency bands and radiation reduction values for different network modes.

In the method for reducing radiation, the step B further comprises:

Step B1: when the modem of the mobile terminal receives the first AT instruction from the AP side, parsing the received first AT instruction, comparing a control instruction obtained from parsing the first AT instruction against a first stored AT instruction, determining whether the control instruction is the same with the first stored AT instruction, and if the control instruction is the same with the first stored AT instruction, controlling the mobile terminal to restore the maximum transmit power for normal operation.

In the method for reducing radiation, the step C further comprises:

Step C1: when the modem of the mobile terminal receives the second AT instruction from the AP side, parsing the received second AT instruction, comparing a control instruction obtained from parsing the second AT instruction against a second stored AT instruction, determining whether the control instruction is the same with the second stored AT instruction, and if the control instruction is the same with the second stored AT instruction, controlling mobile terminal to reduce the maximum transmit power.

In the method for reducing radiation, the step C1 further comprises:

Step C11: adjusting the maximum transmit power of the mobile terminal according to a radiation reduction value included in the second AT instruction.

In the method for reducing radiation, the first AT instruction comprises a first AT instruction identifier, and the second AT instruction comprises a second AT instruction identifier.

The first AT instruction identifier corresponds to a control instruction for controlling the mobile terminal to restore the maximum transmit power for normal operation; and the second AT instruction identifier corresponds to a control instruction for controlling mobile terminal to reduce the maximum transmit power to a preset radiation value.

In the method for reducing radiation, the first AT instruction is AT+ERFTX=4, and the second AT instruction is AT+ERFTX=3, rat, band, dBm.

A second aspect of an embodiment of the invention provides a method for reducing radiation for a mobile terminal with a modem. The method comprises:

detecting operating modes of the mobile terminal, wherein the operating modes comprise a voice call mode and a data communication mode;

the modem receiving a first AT instruction for directing the modem to control the mobile terminal in restoring the maximum transmit power for normal operation if the mobile terminal is in the voice call mode; and the modem receiving a second AT instruction for directing the modem to control the mobile terminal in reducing the maximum transmit power until radiation reduction of the mobile terminal reaches a preset radiation reduction value if the mobile terminal is in the data communication mode.

In the method for reducing radiation, the modem has a preset first radio frequency parameter and a preset second radio frequency parameter. The first radio frequency parameter is used for controlling the mobile terminal to restore the maximum transmit power for normal operation. The second radio frequency parameter is used for the mobile terminal to reduce the maximum transmit power until radiation reduction of the mobile terminal reaches the preset radiation reduction value.

In the method for reducing radiation, the second AT instruction includes frequency bands and radiation reduction values for different network modes.

In the method for reducing radiation, "the modem receiving a first AT instruction for directing the modem to control the mobile terminal in restoring the maximum transmit power for normal operation if the mobile terminal is in the voice call mode" further comprises:

parsing the first AT instruction, comparing a control instruction obtained from parsing the first AT instruction against a first stored AT instruction, determining whether the control instruction is the same with the first stored AT instruction, and if the control instruction is the same with the first stored AT instruction, controlling the mobile terminal to restore the maximum transmit power for normal operation.

In the method for reducing radiation, "the modem receiving a second AT instruction for directing the modem to control the mobile terminal in reducing the maximum transmit power until radiation reduction of the mobile terminal reaches a preset radiation reduction value if the mobile terminal is in the data communication mode" further comprises:

parsing the second AT instruction, comparing a control instruction obtained from parsing the second AT instruction against a second stored AT instruction that is pre-stored in advance, determining whether the control instruction is the same with the second pre-stored AT instruction, and if the control instruction is the same with the second pre-stored AT instruction, controlling mobile terminal to reduce the maximum transmit power.

In the method for reducing radiation, "if the control instruction is the same with the second pre-stored AT instruction, controlling mobile terminal to reduce the maximum transmit power" further comprises:

adjusting the maximum transmit power of the mobile terminal according to a radiation reduction value included in the second AT instruction.

In the method for reducing radiation, the first AT instruction comprises a first AT instruction identifier, and the second AT instruction comprises a second AT instruction identifier.

The first AT instruction identifier corresponds to a control instruction for controlling the mobile terminal to restore the maximum transmit power for normal operation; and the second AT instruction identifier corresponds to a control instruction for controlling mobile terminal to reduce the maximum transmit power to a preset radiation value.

In the method for reducing radiation, the first AT instruction is AT+ERFTX=4, and the second AT instruction is AT+ERFTX=3, rat, band, dBm.

A third aspect of an embodiment of the invention provides a mobile terminal comprising a processor and a modem in communication with the processor.

The modem is equipped with a memory chip storing a computer program. The processor loads the computer program stored in the memory chip to execute:

detecting operating modes of the mobile terminal, wherein the operation modes comprise a voice call mode and a data communication mode;

the modem receiving a first AT instruction for directing the modem to control the mobile terminal in restoring the maximum transmit power for normal operation if the mobile terminal is in the voice call mode; and the modem receiving a second AT instruction for directing the modem to control the mobile terminal in reducing the maximum transmit power until radiation reduction of the mobile terminal reaches a preset radiation reduction value if the mobile terminal is in the data communication mode.

In the mobile terminal for reducing radiation, the modem has a preset first radio frequency parameter and a preset second radio frequency parameter. The first radio frequency parameter is used for controlling the mobile terminal to restore the maximum transmit power for normal operation. The second radio frequency parameter is used for the mobile terminal to reduce the maximum transmit power until radiation reduction of the mobile terminal reaches the preset radiation reduction value.

In the mobile terminal, the second AT instruction includes frequency bands and radiation reduction values for different network modes.

In the mobile terminal, the first AT instruction is AT+ERFTX=4, and the second AT instruction is AT+ERFTX=3, rat, band, dBm.

The invention provides a method and a mobile terminal for reducing radiation, which detect whether a current operating mode of a mobile phone is a voice call mode or a data communication mode. Upon detecting the mobile phone being in the voice call mode, an AP side sends a preset first AT instruction to control a modem restoring the maximum transmit power for normal operation. Upon detecting the mobile phone being in the data communication mode, the AP side sends a preset second AT instruction to control the modem reducing the maximum transmit power. The method, modem, and mobile phone of the invention realize control of radiation via software, thus facilitating a mobile phone to pass FCC and EC certification, and safety tests.

DESCRIPTION OF SPECIFIC EMBODIMENTS OF THE INVENTION

In order to make the purpose, technical scheme, and advantages of the invention clearer and more distinct, the present invention is further detailed in the following with reference to drawings and examples. It should be understood that the specific embodiments described herein are intended only to explain the present invention and not to limit the present invention.

Figure 1:
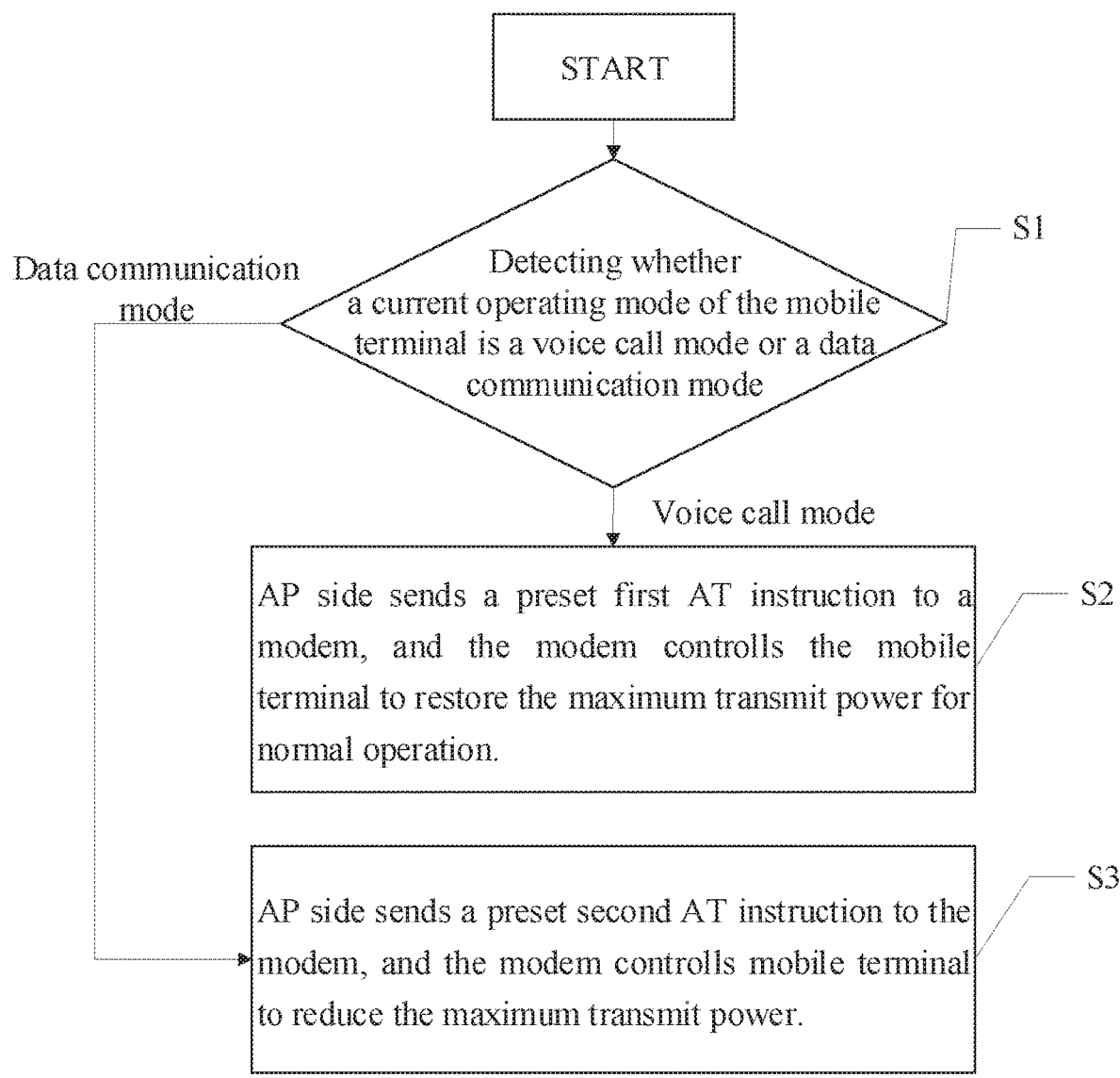
FIG. 1 is a flowchart showing a method of reducing radiation according to an embodiment of the invention.

The invention provides a method for reducing radiation for a mobile terminal, illustrated by a mobile phone hereafter. As shown in FIG. 1, the method for reducing radiation includes following steps:

Step S1: detecting whether a current operating mode of the mobile phone is a voice call mode or a data communication mode, and performing step S2 if the current operating mode is the voice call mode, or performing step S3 if the current operating mode is the data communication mode. That is, operating modes of the mobile terminal are detected. The operating modes comprise a voice call mode and a data communication mode.

An AP side first detects whether the current operating mode of the mobile phone is the voice call mode or the data communication mode. The voice call mode is a state where the mobile phone is performing a voice call task. When the phone is in the voice call mode, step S2 is performed. The data communication mode is a state where the mobile phone is performing a data communication task, that is, the current mobile phone is performing the reception, storage, processing or transmission of digital information, or the information flow control, verification and management, and such kind of data processing. Step S3 is performed when the mobile phone is in the data communication mode.

Step S2: AP side sending a preset first AT instruction to a modem, and the modem controlling the mobile phone to restore the maximum transmit power for normal operation of the mobile phone according to the first AT instruction.

When detecting the mobile phone being in the voice call mode, the AP side issues the preset first AT instruction to the modem. The modem, according to the received first AT instruction, modulates the maximum transmit power of the mobile phone as the maximum transmit power when the mobile phone is running normally. That is, if the mobile terminal is in the voice call mode, then the modem receives the first AT instruction, which is used to instruct the modem to restore the mobile terminal to the maximum transmit power for normal operation of the mobile terminal.

The step S2 further includes:

Step S21: when the modem of the mobile phone receives the first AT instruction from the AP side, parsing the received first AT instruction, comparing a control instruction obtained from parsing the first AT instruction against a first stored AT instruction that is pre-stored in advance, determining whether the control instruction is the same with the first pre-stored AT instruction, and if the control instruction is the same with the first pre-stored AT instruction, restoring the mobile phone to the maximum transmit power for normal operation of the mobile phone.

Step S3: AP side sending a preset second AT instruction to the modem, and the modem controlling mobile terminal to reduce the maximum transmit power according to the second AT instruction until radiation reduction of the mobile terminal reaches a preset radiation reduction value. That is, if the mobile terminal is in the data communication mode, the modem receives the second AT instruction which is used to instruct the modem control to reduce the maximum transmit power of the mobile terminal until the radiation reduction of the mobile terminal reaches the preset value.

When detecting the mobile phone being in the data communication mode, the AP side issues a preset second AT instruction to the modem. According to the received second AT instruction, the modem reduces the maximum transmit power of the mobile phone until radiation reduction of a radiation value of the mobile phone compared with the maximum radiation value reaches a preset radiation value.

For realizing the above steps, it is worth noting that the following steps are further included before the step S1:

Step S0: pre-storing two sets of radio frequency (RF) parameters in the modem of the mobile phone, one set being RF parameters for the mobile phone to resume normal operation after reception of the first AT instruction, and the other set being RF parameters for the mobile phone to reduce radiation after reception of the second AT instruction. That is, the modem has a preset first radio frequency parameter and a preset second radio frequency parameter. The first radio frequency parameter is used for controlling the mobile terminal to restore the maximum transmit power for normal operation. The second radio frequency parameter is used for the mobile terminal to reduce the maximum transmit power until radiation reduction of the mobile terminal reaches the preset radiation reduction value.

To facilitate the control of the maximum transmit power of the mobile phone in different network modes, the second AT instruction contains frequency bands and radiation reduction values for different network modes.

The step S3 further includes:

Step S31: when the modem of the mobile phone receives the second AT instruction from the AP side, parsing the received second AT instruction, comparing a control instruction obtained from parsing the second AT instruction against a second stored AT instruction, determining whether the control instruction is the same with the second stored AT instruction, and if the control instruction is the same with the second stored AT instruction, controlling mobile phone to reduce the maximum transmit power.

The step S31 further includes:

Step S311: adjusting the maximum transmit power of the mobile phone according to a radiation reduction value included in the second AT instruction.

To identify the first AT instruction and the second AT instruction, in an embodiment, the first AT instruction preferably includes a first AT instruction identifier, and the second AT instruction includes a second AT instruction identifier. The first AT instruction identifier corresponds to a control instruction for controlling the mobile phone to restore the maximum transmit power for normal operation, and the second AT instruction identifier corresponds to a control instruction for controlling mobile phone to reduce the maximum transmit power to a preset radiation value, thus preventing the occurrence of errors in identifying the instructions.

Specifically, in an embodiment of the invention, the first AT instruction is AT+ERFTX=4, and the second AT instruction is AT+ERFTX=3, rat, band, dBm.

To further detail the method of the invention, specific applications and embodiments of the invention are described in the following.

Figure 2:
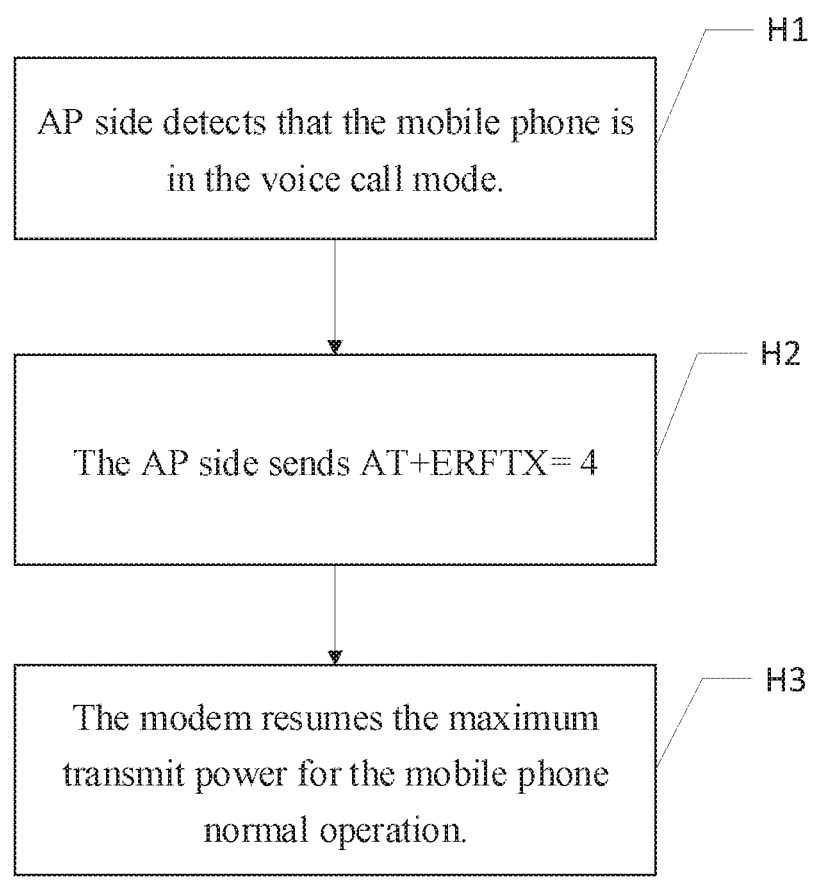
FIG. 2 is a flowchart showing operations of a mobile terminal in a voice call mode according to an embodiment of the invention.

As shown in FIG. 2, if the current operating mode of the mobile phone is the voice call mode, the method of the invention for reducing mobile phone radiation includes the following steps:

Step H1: the AP side performing a step H2 upon detecting that the mobile phone is in the voice call mode;

Step H2: the AP side sending AT+ERFTX=4 to the modem;

Step H3: the modem resuming to a normal transmit power upon receiving an AT message from the AP side.

Figure 3:
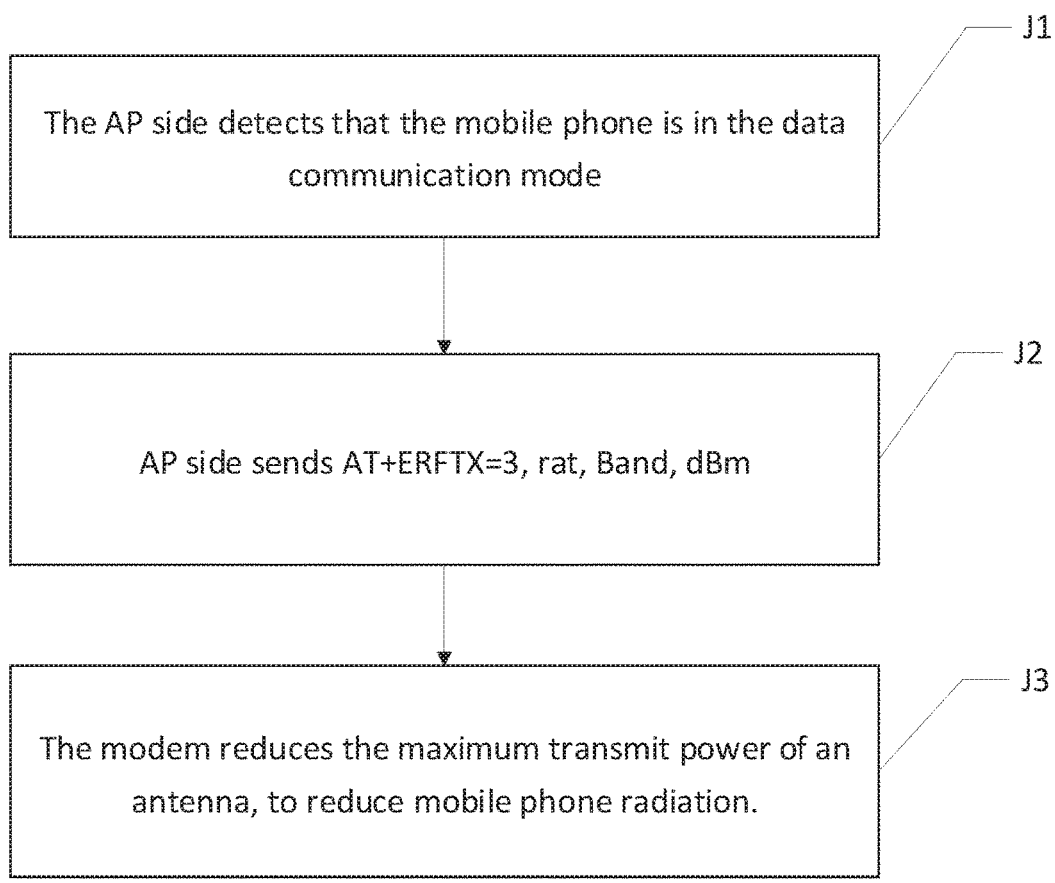
FIG. 3 is a flowchart showing operations of a mobile terminal in a data communication mode according to an embodiment of the invention.

As shown in FIG. 3, if the mobile phone is in the data communication mode, the method of the invention for reducing mobile phone radiation includes the following steps:

Step J1: the AP side detecting a status of the mobile phone, and performing step J2 if the mobile phone is in the data communication mode;

Step J2: sending AT-ERFTX, 3, rat, band, dBm (3 for transmit power reduction, rat for 2G/3G/4G access technology, band for frequency bands, and dBm for transmit power reduction in dBm);

Step J3: the modem receiving an AT message from the AP side, and, if the AT instruction is to reduce the transmit power, reducing the maximum transmit power of an antenna, thus obtaining the effect of reducing specific absorption rate (SAR) for mobile phone radiation.

The method of the invention simply needs to configure an additional set of RF parameters for the modem, which may be relatively simple for software implementation. The effect of reducing radiation may be achieved through issuing an AT command by the AP side to modify the maximum transmit power of the mobile phone.

On the basis of the above-mentioned method, the invention also discloses a modem. The modem is equipped with a memory chip storing a computer program. The computer program can be executed to realize the method of reducing mobile phone radiation.

Figure 4:
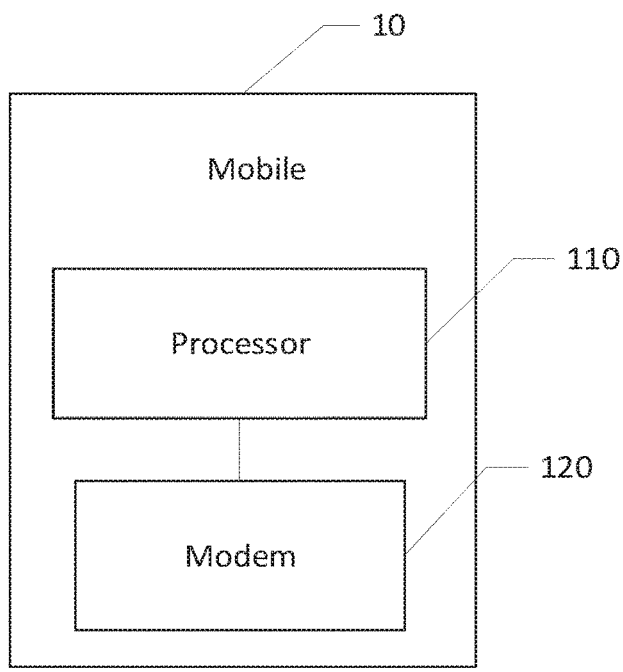
FIG. 4 is a schematic diagram showing operations of a mobile terminal according to an embodiment of the invention.

On the basis of the modem mentioned above, the invention also discloses a mobile phone as shown in FIG. 4. The mobile phone 10 comprises: processor 110 and modem 120 communicationally connected to the processor 110.

The modem 120 is equipped with a memory chip. The memory chip stores a computer program which performs the method of reducing mobile phone radiation when executed by the processor 110.

The processor 110 is used to load the computer program stored in the memory chip in order to perform the method of reducing mobile phone radiation.

The invention provides a method, a modem, and a mobile terminal for reducing radiation, which detect whether a current operating mode of a mobile phone is a voice call mode or a data communication mode. Upon detecting the mobile phone being in the voice call mode, an AP side sends a preset first AT instruction to control a modem restoring the maximum transmit power for normal operation. Upon detecting the mobile phone being in the data communication mode, the AP side sends a preset second AT instruction to control the modem reducing the maximum transmit power. The method, modem, and mobile phone of the invention realize control of radiation via software, thus facilitating a mobile phone to pass FCC and EC certification, and safety tests.

It may be appreciated that, for a person with ordinary skills in the art, substitution and modification may be made according to the technical schemes and principles of the present invention, and all such substitution or modification shall fall within the scope under protection by the claims attached to the disclosure.

What is claimed is:

1. A method for reducing radiation of a mobile terminal, comprising following steps:
   Step A0: pre-storing two sets of radio frequency parameters in the modem, wherein one is a set of radio frequency parameters for the mobile terminal to restore normal operation after receiving a first AT instruction, and the other is a set of radio frequency parameters for the mobile terminal to reduce radiation after receiving a second AT instruction;
   Step A: detecting whether a current operating mode of the mobile terminal is a voice call mode or a data communication mode, and performing step B if the current operating mode is the voice call mode, or performing step C if the current operating mode is the data communication mode; wherein
   Step B is AP side sending the preset first AT instruction to a modem, and the modem controlling the mobile terminal to restore a maximum transmit power for normal operation according to the first AT instruction; and
   Step C is AP side sending the preset second AT instruction to the modem, and the modem controlling the mobile terminal to reduce the maximum transmit power according to the second AT instruction until radiation reduction of the mobile terminal reaches a preset radiation reduction value;

wherein the first AT instruction comprises a first AT instruction identifier, and the second AT instruction comprises a second AT instruction identifier;
   the first AT instruction identifier corresponds to a control instruction for controlling the mobile terminal to restore the maximum transmit power for normal operation; and
   the second AT instruction identifier corresponds to a control instruction for controlling the mobile terminal to reduce the maximum transmit power to a preset radiation value;
   wherein the step B further comprises:
   Step B1: when the modem of the mobile terminal receives the first AT instruction from the AP side, parsing the received first AT instruction, comparing a control instruction obtained from parsing the first AT instruction against a first pre-stored AT instruction, determining whether the control instruction is same as the first pre-stored AT instruction, and if the control instruction is the same as the first pre-stored AT instruction, controlling the mobile terminal to restore the maximum transmit power for normal operation;
   wherein the step C further comprises:
   Step C1: when the modem of the mobile terminal receives the second AT instruction from the AP side, parsing the received second AT instruction, comparing a control instruction obtained from parsing the second AT instruction against a second pre-stored AT instruction, determining whether the control instruction is same as the second pre-stored AT instruction, and if the control instruction is the same as the second pre-stored AT instruction, controlling the mobile terminal to reduce the maximum transmit power.

2. The method for reducing radiation according to claim 1, wherein the second AT instruction includes frequency bands and radiation reduction values for different network modes.

3. The method for reducing radiation according to claim 2, wherein the step C1 further comprises:
   Step C11: adjusting the maximum transmit power of the mobile terminal according to the radiation reduction values included in the second AT instruction.

4. The method for reducing radiation according to claim 1, wherein the first AT instruction is AT+ERFTX=4, and the second AT instruction is AT+ERFTX=3, rat, band, dBm.

5. A method for reducing radiation of a mobile terminal including a modem, comprising:
   detecting operating modes of the mobile terminal, wherein the operating modes comprise a voice call mode and a data communication mode;
   the modem receiving a first AT instruction directing the modem to control the mobile terminal in restoring a maximum transmit power for normal operation if the mobile terminal is in the voice call mode; and
   the modem receiving a second AT instruction directing the modem to control the mobile terminal in reducing the maximum transmit power until radiation reduction of the mobile terminal reaches a preset radiation reduction value if the mobile terminal is in the data communication mode;
   wherein the modem has a preset first radio frequency parameter and a preset second radio frequency parameter, the first radio frequency parameter is used to control the mobile terminal to restore the maximum transmit power for normal operation, and the second radio frequency parameter is used for the mobile terminal to reduce the maximum transmit power until radiation reduction of the mobile terminal reaches the preset radiation reduction value;

wherein the first AT instruction comprises a first AT instruction identifier, and the second AT instruction comprises a second AT instruction identifier;

the first AT instruction identifier corresponds to a control instruction for controlling the mobile terminal to restore the maximum transmit power for normal operation; and the second AT instruction identifier corresponds to a control instruction for controlling the mobile terminal to reduce the maximum transmit power to a preset radiation value, and the method further comprises:

parsing the first AT instruction, comparing a control instruction obtained from parsing the first AT instruction against a first pre-stored AT instruction, determining whether the control instruction is same as the first pre-stored AT instruction, and if the control instruction is the same as the first pre-stored AT instruction, controlling the mobile terminal to restore the maximum transmit power for normal operation; and parsing the second AT instruction, comparing a control instruction obtained from parsing the second AT instruction against a second pre-stored AT instruction, determining whether the control instruction is same as the second pre-stored AT instruction, and if the control instruction is the same as the second pre-stored AT instruction, controlling the mobile terminal to reduce the maximum transmit power.

6. The method for reducing radiation according to claim 5, wherein the second AT instruction includes frequency bands and radiation reduction values for different network modes.

7. The method for reducing radiation according to claim 6, wherein "if the control instruction is the same as the second pre-stored AT instruction, controlling the mobile terminal to reduce the maximum transmit power" further comprises:

adjusting the maximum transmit power of the mobile terminal according to radiation reduction values included in the second AT instruction.

8. The method for reducing radiation according to claim 5, wherein the first AT instruction is AT+ERFTX=4, and the second AT instruction is AT+ERFTX=3, rat, band, dBm.

9. A mobile terminal, comprising:
a processor; and
a modem in communicationally connected to the processor;

wherein the modem is equipped with a memory chip storing a computer program, and the processor loads the computer program stored in the memory chip to execute following steps:

detecting operating modes of the mobile terminal, wherein the operating modes comprise a voice call mode and a data communication mode;

the modem receiving a first AT instruction for directing the modem to control the mobile terminal in restoring a maximum transmit power for normal operation if the mobile terminal is in the voice call mode; and the modem receiving a second AT instruction for directing the modem to control the mobile terminal in reducing the maximum transmit power until radiation reduction of the mobile terminal reaches a preset radiation reduction value if the mobile terminal is in the data communication mode;

wherein the modem has a preset first radio frequency parameter and a preset second radio frequency parameter, the first radio frequency parameter is used to control the mobile terminal to restore the maximum transmit power for normal operation, and the second radio frequency parameter is used for the mobile terminal to reduce the maximum transmit power until radiation reduction of the mobile terminal reaches the preset radiation reduction value;

wherein the first AT instruction comprises a first AT instruction identifier, and the second AT instruction comprises a second AT instruction identifier;

the first AT instruction identifier corresponds to a control instruction for controlling the mobile terminal to restore the maximum transmit power for normal operation; and the second AT instruction identifier corresponds to a control instruction for controlling the mobile terminal to reduce the maximum transmit power to a preset radiation value, and the processor further executes:

parsing the first AT instruction, comparing a control instruction obtained from parsing the first AT instruction against a first pre-stored AT instruction, determining whether the control instruction is same as the first pre-stored AT instruction, and if the control instruction is the same as the first pre-stored AT instruction, controlling the mobile terminal to restore the maximum transmit power for normal operation; and parsing the second AT instruction, comparing a control instruction obtained from parsing the second AT instruction against a second pre-stored AT instruction, determining whether the control instruction is same as the second pre-stored AT instruction, and if the control instruction is the same as the second pre-stored AT instruction, controlling the mobile terminal to reduce the maximum transmit power.

10. The mobile terminal according to claim 9, wherein the second AT instruction includes frequency bands and radiation reduction values for different network modes.

11. The mobile terminal according to claim 9, wherein the first AT instruction is AT+ERFTX=4, and the second AT instruction is AT+ERFTX=3, rat, band, dBm.

* * * * *